United States Patent
Yoshioka

(10) Patent No.: US 7,656,550 B2
(45) Date of Patent: Feb. 2, 2010

(54) DATA TRANSMISSION APPARATUS AND TRANSMISSION CONTROL PROGRAM

(75) Inventor: Tetsuya Yoshioka, Kawasaki (JP)

(73) Assignee: Kyocera Mita Corporation (JP)

( * ) Notice: Subject to any disclaimer, the term of this patent is extended or adjusted under 35 U.S.C. 154(b) by 839 days.

(21) Appl. No.: 11/297,751

(22) Filed: Dec. 8, 2005

(65) Prior Publication Data
US 2006/0140376 A1 Jun. 29, 2006

(30) Foreign Application Priority Data
Dec. 10, 2004 (JP) ............................ P2004-358110

(51) Int. Cl.
H04N 1/46 (2006.01)
H04N 1/00 (2006.01)
G06F 3/12 (2006.01)

(52) U.S. Cl. ...................... 358/1.15; 358/500; 358/501; 358/400; 358/401; 358/402; 358/403; 358/407

(58) Field of Classification Search .................. 358/500, 358/1.15, 501, 400, 401, 402, 403, 407; 379/216, 379/88.03, 100.14, 256, 280, 281, 341, 355, 379/359; 709/206; 713/202
See application file for complete search history.

(56) References Cited

U.S. PATENT DOCUMENTS 5,966,436 A * 10/1999 Kim ....................... 379/216.01
2003/0236847 A1* 12/2003 Benowitz et al. ............ 709/206

FOREIGN PATENT DOCUMENTS

| JP | 10-190768 | 7/1998 |
| JP | 11-239257 | 8/1999 |
| JP | 11-331447 | 11/1999 |
| JP | 2000-101812 | 4/2000 |
| JP | 2000-134383 | 5/2000 |
| JP | 2001-313777 | 11/2001 |
| JP | 2003-198819 | 7/2003 |
| JP | 2003-228262 | 8/2003 |
| JP | 2003-241928 | 8/2003 |
| JP | 2003-324575 | 11/2003 |
| JP | 2004-336109 | 11/2004 |

OTHER PUBLICATIONS

Japanese Office Action dated Jan. 29, 2008.
Japanese Office Action dated May 11, 2007 with translation.
Japanese Office Action dated Apr. 22, 2008 in corresponding Japanese Application No. 2004-358110.

* cited by examiner

Primary Examiner—Edward L Coles
Assistant Examiner—Charlotte M Baker
(74) Attorney, Agent, or Firm—Ostrolenk Faber LLP

(57) ABSTRACT

A data transmission apparatus having a plurality of data transmission functions includes: a transmission operation storage device that, for each data transmission function, stores recipient information that was input during an immediately prior transmission operation; a selecting device that selects one data transmission function from a plurality of data transmission functions; an operation content reading device that reads contents of transmission operations; a resend executing device that reads recipient information for the data transmission function selected from the transmission function storage device by the selecting device, and executes a transmission operation based on the read recipient information; and a transmission executing device that stores the read operation content in the transmission operation storage device as recipient information for the data transmission function selected by the selecting device, and executes a transmission operation based on the read operation content.

7 Claims, 4 Drawing Sheets

FIG. 4

| TRANSMISSION FUNCTION | IDENTIFICATION NAME | RECIPIENT INFORMATION |
|---|---|---|
| FAX | ○○COMPANY LTD. | FAX NUMBER |
| | ××COMPANY LTD. | FAX NUMBER |
| | ⋮ | ⋮ |
| EMAIL | △△COMPANY LTD. | EMAIL ADDRESS |
| | □□COMPANY LTD. | EMAIL ADDRESS |
| | ⋮ | ⋮ |
| FILE TRANSFER | ○○SERVER | COMPUTER ADDRESS |
| | ○○COMPUTER | COMPUTER ADDRESS |
| | ⋮ | ⋮ |

FIG. 5

| TRANSMISSION FUNCTION | RECIPIENT INFORMATION | CONFIDENTIAL INFORMATION (NOT DISPLAYED) |
|---|---|---|
| FAX | FAX NUMBER | |
| EMAIL | EMAIL ADDRESS | |
| FILE TRANSFER | COMPUTER ADDRESS | LOGIN NAME PASSWORD |

DATA TRANSMISSION APPARATUS AND TRANSMISSION CONTROL PROGRAM

BACKGROUND OF THE INVENTION

1. Field of the Invention

The present invention relates to a data transmission apparatus and a transmission control program that make it possible to simplify operations when transmitting data.

Priority is claimed on Japanese Patent Application No. 2004-358110, filed Dec. 10, 2004, the contents of which are incorporated herein by reference.

2. Description of Related Art

Conventionally, when contents that have been operated on immediately prior to a particular time have been stored and an operator then wishes to transmit information to the same recipient, a function (a redial function) is widely known (for example, see Japanese Unexamined Patent Application, First Publication No. 2000-101812) that redials based on the memorized operating contents when a redial function is selected.

Modern multi-function office machines have a number of transmission functions such a transmitting faxes, transmitting email, and transferring files. As a result, transmission operations are complicated. For example, for a fax transmission only the fax number (i.e., the telephone number) needs to be input, while an email transmission requires the inputting of an email address. Moreover, because the recipient of a file transfer is a memory device inside a computer, it is necessary to input authorization information in order to log in on the recipient computer. In order to simplify this type of complicated recipient information input, address book information is often stored inside the photocopier, and by selecting the desired recipient from among recipients registered in the address book, the transmission task is simplified.

However, if the multi-function machine has a plurality of transmission functions, information that needs to be input in order to specify the recipient (i.e., the telephone number or address) is different for each transmission function. As a result, the problem arises that using this method does not work for a conventional redial function. Moreover, if it is necessary to input confidential information such as authorization information, as in the case of a file transfer, then in a conventional redial function in which the contents of the immediately prior operation are stored, a problem may arise in that the confidential information may be leaked to another person.

SUMMARY OF THE INVENTION

The present invention was conceived in view of the above circumstances and it is an object thereof to provide a data transmission apparatus and a transmission control program that make it possible to simplify operations when transmitting data.

The present invention is a data transmission apparatus having a plurality of data transmission functions that includes: a transmission operation storage device that, for each data transmission function, stores recipient information that was input during an immediately prior transmission operation; a selecting device that selects one data transmission function from a plurality of data transmission functions; an operation content reading device that reads contents of transmission operations; a resend executing device that, when a content of an operation read by the operation content reading device indicates a resend, reads recipient information for the data transmission function selected from the transmission function storage device by the selecting device, and executes a transmission operation based on the read recipient information; and a transmission executing device that, when a content of an operation read by the operation content reading device does not indicate a resend, stores the read operation content in the transmission operation storage device as recipient information for the data transmission function selected by the selecting device, and executes a transmission operation based on the read operation content.

The present invention is also a data transmission apparatus that transmits data to a computer and includes: a transmission operation storage device that stores recipient information and authorization information that was input during an immediately prior transmission operation; an operation content reading device that reads operation contents during data transmissions; a resend executing device that, when a content of an operation read by the operation content reading device is the same as the immediately prior recipient information, reads authorization information from the transmission operation storage device and, based on the read authorization information, executes a data transmission after executing login processing to login on a recipient computer; and a transmission executing device that, when a content of an operation read by the operation content reading device is not the same as the immediately prior recipient information, stores the read operation content in the transmission operation storage device as recipient information and authorization information and, based on the read operation content, executes a data transmission after executing login processing to login on a recipient computer.

The present invention is also a transmission control program that is provided with a transmission operation storage device that, for each data transmission function, stores recipient information that was input during an immediately prior transmission operation, and that operates on a data transmission apparatus having a plurality of data transmission functions, and includes: selecting processing in which one data transmission function is selected from a plurality of data transmission functions; operation content reading processing in which contents of transmission operations are read; resend executing processing in which, when a content of an operation read in the operation content reading processing indicates a resend, recipient information is read for the data transmission function selected from the transmission function storage device in the selecting processing, and a transmission operation is executed based on the read recipient information; and transmission executing processing in which, when a content of an operation read in the operation content reading processing does not indicate a resend, the read operation content is stored in the transmission operation storage device as recipient information for the data transmission function selected in the selecting processing, and a transmission operation is executed based on the read operation content.

The present invention is also a transmission control program that is provided with a transmission operation storage device that stores recipient information and authorization information that was input during an immediately prior transmission operation, and that operates on a data transmission apparatus that transmits data to a computer, and includes: operation content reading processing in which operation contents are read during data transmissions; resend executing processing in which, when a content of an operation read in the operation content reading processing is the same as the immediately prior recipient information, authorization information is read from the transmission operation storage device and, based on the read authorization information, a data transmission is executed after login processing to login on a recipient computer has been executed; and transmission executing processing in which, when a content of an operation read in the operation content reading processing is not the same as the immediately prior recipient information, the read operation content is stored in the transmission operation storage device as recipient information and authorization information and, based on the read operation content, a data transmission is executed after login processing to login on a recipient computer has been executed.

According to the present invention, for each transmission operation the operation contents (i.e., the recipient information) immediately prior to that transmission operation are stored, and when a resend transmission is selected, the stored recipient information is read and a transmission operation is executed. As a result, the effect is obtained that it is possible to simplify operations in cases such as when information is transmitted to the same recipient.

In addition, only the login name and password, which are input in order to obtain authorization during login, that were input immediately prior to that moment are stored, and when a file transfer is made to the same recipient, the stored login name and password are read and used for the authorization. As a result, the effect is obtained that it is possible to simplify operations in cases such as when a file transfer is made repeatedly to the same recipient.

BRIEF DESCRIPTION OF THE DRAWINGS

FIG. 4 is an explanatory view showing a table structure of the address book memory section shown in FIG. 1.

FIG. 5 is an explanatory view showing a table structure of the transmission operation memory section shown in FIG. 1.

DETAILED DESCRIPTION OF THE INVENTION

Figure 1:
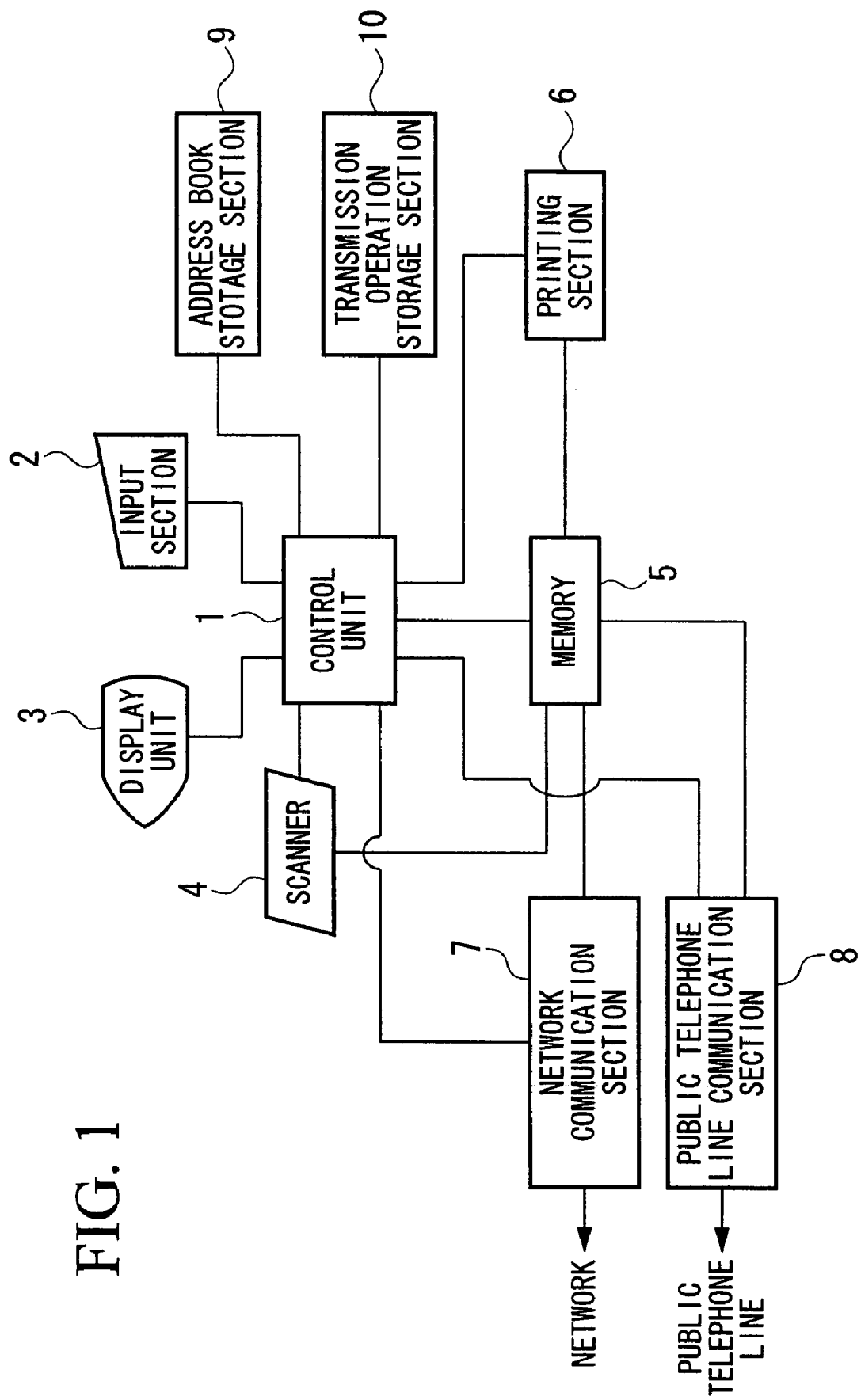
FIG. 1 is a block diagram showing the structure of an embodiment of the present invention.

A data transmission apparatus according to an embodiment of the present invention will now be described with reference made to the drawings. FIG. 1 is a block diagram showing the structure of this embodiment. Here, an image forming apparatus having a plurality of functions such as copying, printing, transmitting and receiving faxes, and image reading is described as an example of a data transmission apparatus. In FIG. 1, reference symbol 1 denotes a control unit that performs the overall control of the processing operations of the image forming apparatus. Reference symbol 2 denotes an input section that is formed by a ten key, function keys, a touch panel, and the like. Reference symbol 3 denotes a display unit that is formed by a liquid crystal display or the like. Reference symbol 4 denotes a scanner that reads an original image that is placed on an original plate and outputs digital image data. Reference symbol 5 denotes memory that stores image data and the like, and is used as a working area in image formation processing. Reference symbol 6 denotes a printing section that prints onto printing paper based on image data that is stored in the memory 5. Reference symbol 7 denotes a network communication section that communicates with other devices via a computer network. Reference symbol 8 denotes a public telephone line communication section that conducts fax transmission and reception communication via a public telephone line. Reference symbol 9 denotes an address book storage section in which recipient information that is used to transmit information is stored. Reference symbol 10 denotes a transmission operation storage section in which are stored the contents of operations performed by a user when transmitting information. Here, "transmission operation" refers to an operation to perform any one of a fax transmission, an email transmission, and a file transfer.

Next, the table structure of the address book storage section 9 shown in FIG. 1 will be described with reference made to FIG. 4. For each of the three transmission functions (i.e., a fax transmission, an email transmission, and a file transfer), recipient information and an identification name that is made up of an optional character string input by a user during registration in order to identify a recipient are associated with each other and stored in the address book storage section 9. The recipient information for a fax transmission is a numeric string indicating a telephone number. The recipient information for an email transmission is a character string indicating an email address. The recipient information for a file transfer is a character string indicating a computer name and a folder name.

Next, the table structure of the transmission operation storage section 10 shown in FIG. 1 will be described with reference made to FIG. 5. For each of the three transmission functions (i.e., a fax transmission, an email transmission, and a file transfer), a character string indicating recipient information input by a user via the input section 2 immediately prior to that point in time (i.e., the most recent input) is stored in the transmission operation storage section 10. For a file transfer, confidential information that is made up of a character string for a password and a login name for logging in to the recipient computer is also associated with the recipient information and stored. However, the character string that is stored in the transmission operation storage section 10 is simply a character string that the user inputs via the input section 2 and no check whatsoever is made on the validity of the character string. In other words, a character string that is input at a predetermined input timing is not processed, and is simply stored as it is without any modification.

Figure 2:
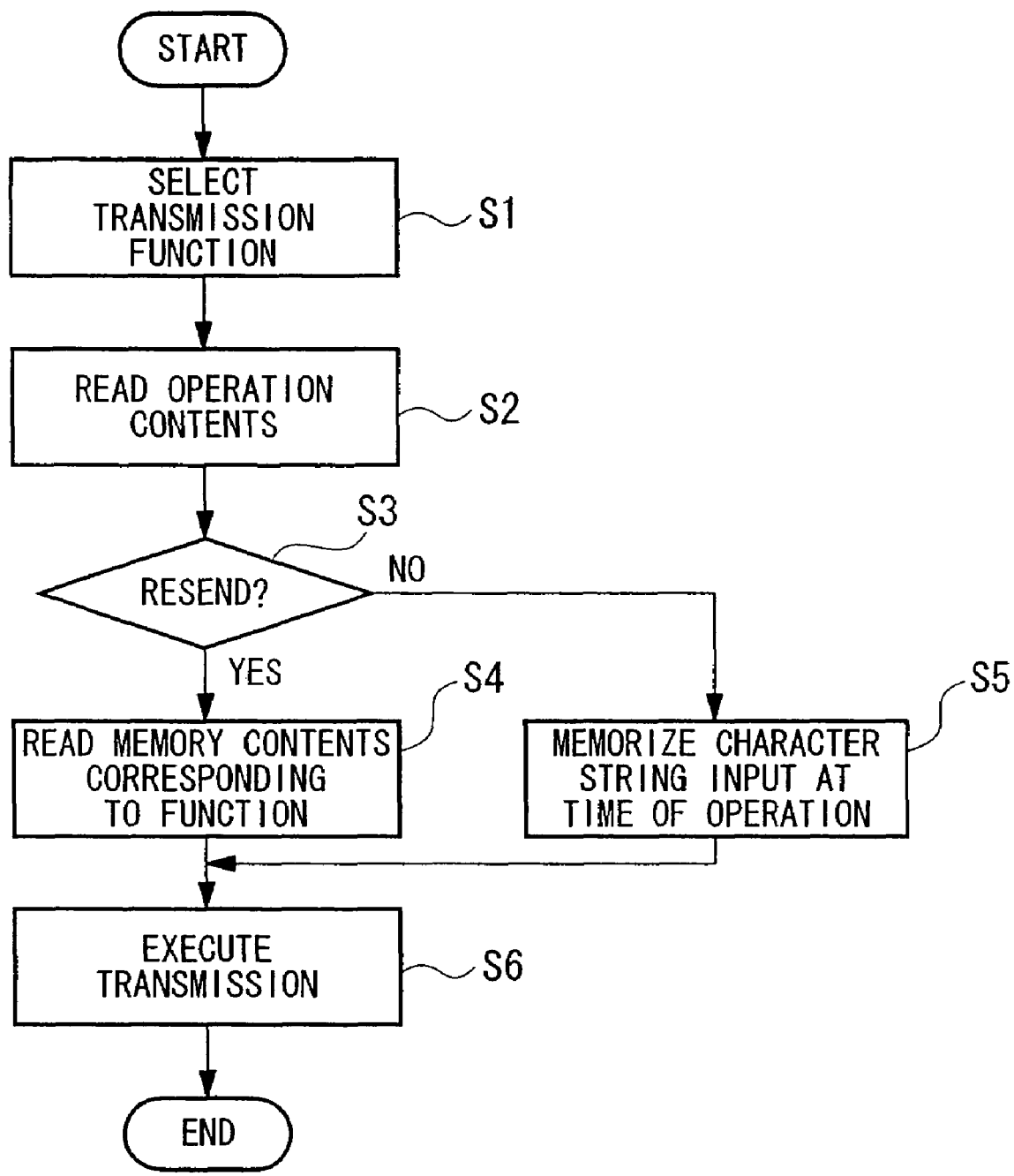
FIG. 2 is a flowchart showing an operation of the apparatus shown in FIG. 1.

Next, a description will be given with reference made to FIG. 2 of the operation of the control unit 1 when the "resend" button is pressed by a user. Firstly, the user selects a transmission function by operating the input section 2. The function selected here may be either a fax transmission, an email transmission, or a file transfer. The control unit 1 specifies the selected transmission function and internally holds the identification information for the transmission function (step S1). The user then performs operations corresponding to the transmission function selected here. For example, if the selected function is a fax transmission, then the user sets the original to be transmitted in the original feed apparatus. If, on the other hand, the selected function is an email transmission, the user selects the data to be attached to the email being sent. If the selected function is a file transfer, the user selects the file to be transferred.

Next, the control unit 1 displays a message on the display unit 3 instructing that transmission information that corresponds to the selected transmission function be input. For example, if the selected function is a fax transmission, "Input telephone number" is displayed. Here, the user inputs the recipient information via the input section 2. This input of the recipient information may be performed using any one of three methods, namely: (1) pressing the "resend" button; (2) pressing the address book button and then selecting an address from the address book displayed on the display unit 3; and (3) inputting the recipient's character string using the input section 2.

The control unit 1 reads the contents that have been input here by an operation of the user via the input section 2 (step S2). The control unit 1 then determines whether or not the operation contents were for an operation to press the "resend" button (step S3). If, as a result of this determination, it is determined that the "resend" button was pressed, the control unit 1 reads the recipient information (see FIG. 5) corresponding to the selected transmission function (i.e., a fax, an email, or a file transfer) using the transmission operation storage section 10 (step S4). The control unit 1 then displays the read recipient information on the display unit 3 and executes a transmission operation as if this read recipient information had been input via the input section 2 (step S6). At this time, if the contents of the operation immediately prior thereto were to select a recipient from the address book, then the recipient information stored in the address book storage section 9 is read and a transmission operation is executed. As a result, the network communication section 7 or the public telephone line communication section 8 starts up and a transmission of image data or the like stored in the memory 5 is made.

In contrast, if the operation performed by the user is not one to press the "resend" button, the control unit 1 stores the character string of the recipient information or the pressed key string input during the operation in the transmission operation storage section 10 (step S5). At this time, if the operation contents were to select a recipient from the address book, then the identification name that is associated with the recipient information is stored. The control unit 1 then executes the transmission operation using the contents input in an operation by the user via the input section 2 as recipient information (step S6).

In this manner, the contents of the operation immediately prior (i.e., recipient information) are stored for each transmission function, and if the "resend" button is pressed, the stored recipient information is read and a transmission operation is executed. As a result, it is possible to simplify operations when a transmission of information is made to the same recipient.

Figure 3:
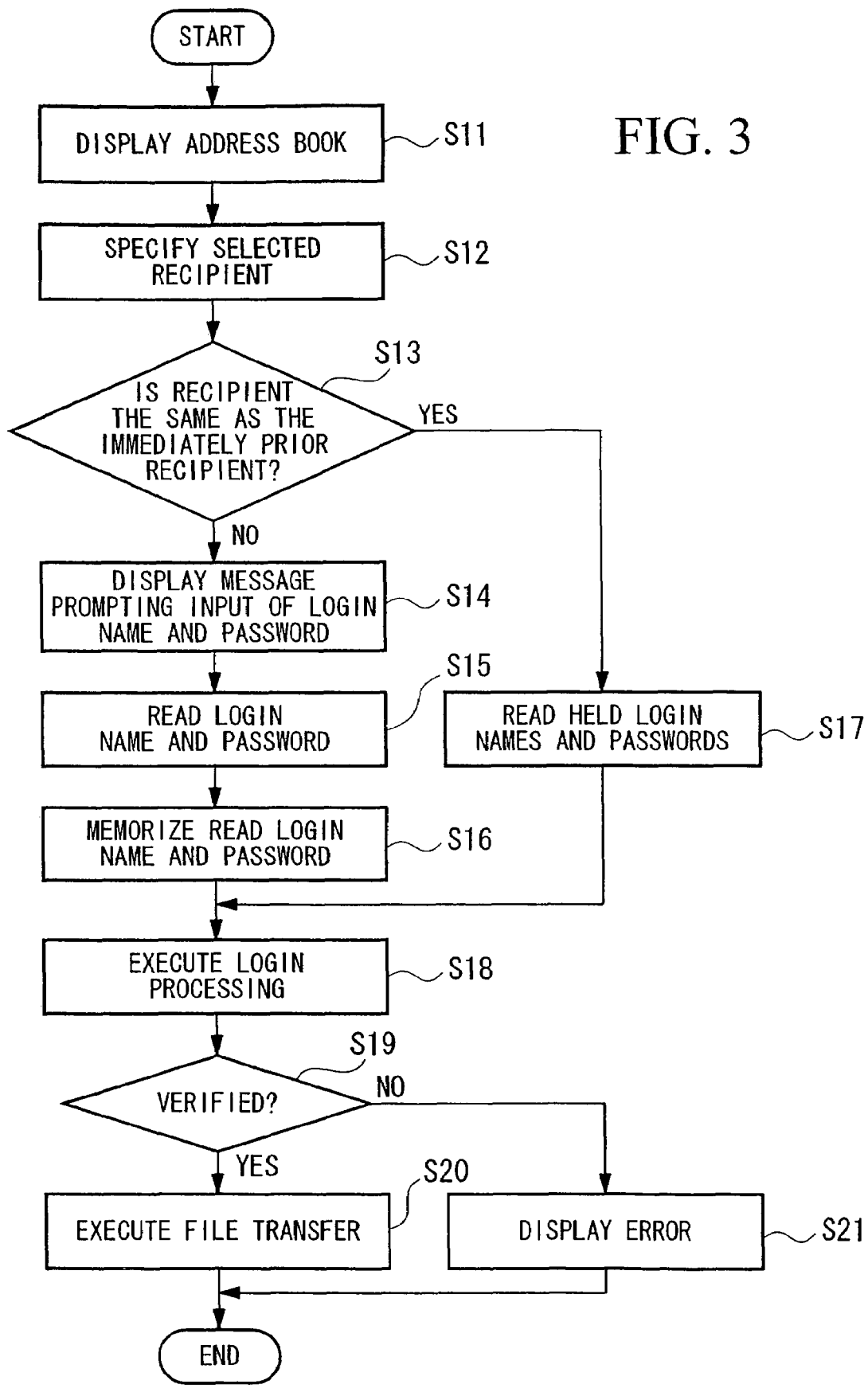
FIG. 3 is a flowchart showing an operation of the apparatus shown in FIG. 1.

Next, a description will be given with reference made to FIG. 3 of an operation of the control unit 1 during a file transfer. Unlike a fax transmission or email transmission, because a file transfer requires logging onto a recipient computer, authorization processing at login time is required. The operation shown in FIG. 3 is a simplified method of performing a resend operation while preventing any leak of the login name and password that are necessary for the authorization processing. Firstly, a user selects file transfer as the transmission function via the input section 2, and performs an operation to select the file to be transferred. Upon receiving this, the control unit 1 displays on the display unit 3 a message instructing that recipient information corresponding to the selected transmission function be input. For example, "Input recipient" may be displayed. Here, the user performs an operation via the input section 2 to display the address book. Upon receiving this, the control unit 1 reads recipient information for file transfers from the recipient information stored in the address book storage section 9 and displays it on the display unit 3 (step S11). Upon receiving this, the user selects one of the displayed recipient information items by operating the input section 2.

The control unit 1 specifies the selected recipient information (step S12), and determines whether or not the recipient is the same as for the transmission immediately prior thereto (step S13). This determination is made by determining whether or not the selected recipient information matches the recipient information stored in the transmission operation storage section 10. If the result of this determination is that the recipient is not the same as the immediately prior recipient, the control unit 1 displays a message on the display unit 3 instructing that the login name and password be input (step S14). Here, the user inputs the login name and password via the input section 2. During this input, the control unit 1 does not make an echo back display of the password input. The control unit 1 then reads the login name and password input here (step S15), and stores them in the transmission operation storage section 10 (step S116). If, on the other hand, the recipient is the same as the immediately prior recipient, the control unit 1 reads the login name and password stored in the transmission operation storage section 10 (step S17). At this time, the control unit 1 does not display the read login name and password on the display unit 3.

Next, the control unit 1 starts up the network communication section 7 and, using the input or read login name and password, executes login processing to login on the file transfer recipient computer (step S18). The control unit 1 then determines whether or not authorization has been given (step S19) and, if authorization has been given, executes the file transfer (step S20). If authorization has not been given, the control unit 1 displays an error message on the display unit 3 (step S21).

In this manner, only the login name and password, which are input in order to obtain authorization during login, that were input immediately prior thereto are stored, and when a file transfer is made to the same recipient, the stored login name and password are read and used for the authorization. As a result, it is possible to simplify operations in cases such as when a file transfer is made repeatedly to the same recipient. Moreover, because stored login names and passwords are not displayed on the display unit 3 even when these are used, it is possible to prevent the login names and passwords from being used illegally.

Note that it is also possible to delete contents stored in the transmission operation storage section 10 when a user performs a predetermined operation (for example, pressing a reset button).

Moreover, it is also possible for a program that achieves the functions of the control unit 1 shown in FIG. 1 to be recorded on a computer readable recording medium, and for a computer system to then read and execute the program recorded on this recording medium so as to perform information transmission control processing. Here, the term "computer system" includes operating systems and hardware such as peripheral devices. "Computer system" can also include World Wide Web systems provided with home page providing environments (or display environments). The term "computer readable recording medium" refers to portable media such as flexible disks, magneto optical disks, ROM, CD-ROM, and the like and to storage devices such as hard disks incorporated in computer systems. "Computer readable recording medium" may also include devices that hold programs for a fixed time such as the volatile memory (RAM) incorporated in a computer system that forms a server or client when a program is transmitted via a communication line such as a telephone line or a network such as the Internet.

Moreover, the above described program may also be transmitted from a computer system that has this program stored in an internal storage device to another computer system via transmission medium or by a transmission wave within a transmission medium. Here, the "transmission medium" that transmits this program is a medium having a function of transmitting information such as, for example, a communication line such as a telephone line or a network (i.e., a communication network) such as the Internet. In addition, the above described program may also be intended to achieve a portion of the above described the functions. Furthermore, the above described program may be what is known as a differential file (i.e., a differential program) that achieves the above described functions in combination with a program that has already been recorded on the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A data transmission apparatus having a plurality of data transmission functions, each data transmission function performing transmission of a different form of data from the forms of data whose transmission is performed by the other data transmission functions, comprising:
   a transmission operation storage device that, for each data transmission function, stores recipient information that was input during an immediately prior transmission operation;
   a selecting device that selects one data transmission function from a plurality of the data transmission functions;
   an operation content reading device that reads contents of transmission operations;
   a resend executing device that, when the content of a transmission operation read by the operation content reading device indicates a resend, reads recipient information, for the data transmission function selected by the selecting device, from the transmission operation storage device, and executes a transmission operation based on the read recipient information; and
   a transmission executing device that, when the content of a transmission operation read by the operation content reading device does not indicate a resend, stores the read operation content in the transmission operation storage device as recipient information for the data transmission function selected by the selecting device, and executes a transmission operation based on the read operation content.

2. A data transmission apparatus as claimed in claim 1, wherein if a user performs a predetermined operation, the contents stored in the transmission operation storage device are deleted.

3. A transmission control program recorded on a first computer readable recording medium, the transmission control program storing transmission operation information on the first computer readable recording medium or on a second computer readable recording medium, the storage of the transmission operation information including, for each data transmission function, the storage of recipient information that was input during an immediately prior transmission operation, the first and the second computer readable recording mediums being located on a computer system, the transmission control program operating on a data transmission apparatus having a plurality of data transmission functions by communicating with the data transmission apparatus over a communication medium connecting the computer system with the data transmission apparatus, the transmission control program performing the following steps:
   selecting processing in which one data transmission function is selected from the plurality of data transmission functions, each data transmission function performing transmission of a different form of data from the forms of data whose transmission is performed by the other data transmission functions;
   operation content reading processing in which contents of transmission operations are read;
   resend executing processing in which, when a content of an operation read in the operation content reading processing indicates a resend, recipient information is read, for the data transmission function selected in the selecting processing, from the first or the second computer readable recording medium and a transmission operation is executed based on the read recipient information; and
   transmission executing processing in which, when a content of an operation read in the operation content reading processing does not indicate a resend, the read operation content is stored on the first or the second computer readable recording medium as recipient information for the data transmission function selected in the selecting processing, and a transmission operation is executed based on the read operation content.

4. A transmission control program recorded on a first computer readable recording medium, the transmission control program storing transmission operation information on the first computer readable recording medium or on a second computer readable recording medium, the storage of the transmission operation information including the storage of recipient information and authorization information that was input during an immediately prior transmission operation, the first and the second computer readable recording mediums being located on a computer system, the transmission control program operating on a data transmission apparatus that transmits data to a computer by communicating with the data transmission apparatus over a communication medium connecting the computer system with the data transmission apparatus, the data transmission apparatus having a plurality of data transmission functions, each data transmission function performing transmission of a different form of data from the forms of data whose transmission is performed by the other data transmission functions, the transmission control program performing the following steps:
   operation content reading processing in which operation contents of transmission operations are read during data transmissions;
   resend executing processing in which, when the content of the recipient information of a transmission operation read in the operation content reading processing is the same as the immediately prior recipient information, authorization information is read from the the first or the second computer readable recording medium and, a data transmission is executed after login processing to login on a recipient computer, based on the read authorization information, has been executed; and
   transmission executing processing in which, when the content of the recipient information of a transmission operation read in the operation content reading processing is not the same as the immediately prior recipient information, the read operation content is stored on the first or the second computer readable recording medium as recipient information and authorization information and, based on the read operation content, a data transmission is executed after login processing to login on a recipient computer has been executed.

5. A data transmission apparatus having a plurality of data transmission functions, each data transmission function performing transmission of a different form of data from the forms of data whose transmission is performed by the other data transmission functions, the data transmission apparatus transmitting data to a computer and comprising:

a transmission operation storage device that stores recipient information and authorization information that was input during an immediately prior transmission operation;

an operation content reading device that reads operation contents of transmission operations during data transmissions;

a resend executing device that, when the content of the recipient information of a transmission operation read by the operation content reading device is the same as the immediately prior recipient information, reads authorization information from the transmission operation storage device and executes a data transmission after executing login processing, based on the read authorization information, to login on a recipient computer; and a transmission executing device that, when the content of the recipient information of a transmission operation read by the operation content reading device is not the same as the immediately prior recipient information, stores the read operation content in the transmission operation storage device as recipient information and authorization information and, based on the read operation content, executes a data transmission after executing login processing to login on a recipient computer.

6. A data transmission apparatus as claimed in claim 5, wherein if a user performs a predetermined operation, the contents stored in the transmission operation storage device are deleted.

7. A data transmission apparatus as claimed in claim 5, wherein, if the content of the recipient information of a transmission operation read by the operation content reading device is the same as the immediately prior recipient information, the resend executing device does not display the read authorization information.

* * * * *